US012689309B2

(12) United States Patent
Alvi et al.

(10) Patent No.: US 12,689,309 B2
(45) Date of Patent: Jul. 21, 2026

(54) MULTILEVEL DIRECT CURRENT (DC) POWER SOURCE POWERING MULTILEVEL INVERTER

(71) Applicant: GM Global Technology Operations LLC, Detroit, MI (US)

(72) Inventors: Muhammad Hussain Alvi, Troy, MI (US); Renato Amorim Torres, Pontiac, MI (US); Chandra S. Namuduri, Troy, MI (US); Rashmi Prasad, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 133 days.

(21) Appl. No.: 18/315,081

(22) Filed: May 10, 2023

(65) Prior Publication Data

US 2024/0380334 A1     Nov. 14, 2024

(51) Int. Cl.
*H02M 7/487*     (2007.01)
*B60L 50/51*     (2019.01)
*H02M 7/483*     (2007.01)

(52) U.S. Cl.
CPC ......... *H02M 7/487* (2013.01); *H02M 7/4833* (2021.05); *H02M 7/4835* (2021.05); *B60L 50/51* (2019.02)

(58) Field of Classification Search
CPC .. H02M 7/4833; H02M 7/4835; H02M 7/487; B60L 50/51
See application file for complete search history.

(56) References Cited

U.S. PATENT DOCUMENTS

2021/0083597 A1*   3/2021   Hayashi ............. H02M 7/4837

FOREIGN PATENT DOCUMENTS

DE       102014226159 A1 *   6/2016   .......... H02M 7/4811

* cited by examiner

*Primary Examiner* — Jue Zhang
(74) *Attorney, Agent, or Firm* — CANTOR COLBURN LLP

(57) ABSTRACT
A multilevel inverter includes a set of inverter switches arranged in a multilevel inverter topology. The multilevel inverter topology has a high voltage (V) input, a low voltage input and an intermediate voltage input. A first voltage source connects the high voltage input to the intermediate voltage input and a second voltage source connects the intermediate voltage input to the low voltage source.

20 Claims, 5 Drawing Sheets

10

12

16     20     22

18     21

14

200

MULTILEVEL DIRECT CURRENT (DC) POWER SOURCE POWERING MULTILEVEL INVERTER

INTRODUCTION

The subject disclosure relates to multilevel inverters configured to draw power from direct current (DC) voltage power sources having multilevel outputs.

Electric vehicles and hybrid electric vehicles include energy storage systems that store electrical energy and output DC voltage. Drive motors, and other mechanical features of the vehicle, however, require alternating voltage and current to operate. To facilitate converting DC voltage to alternating current (AC) voltage, vehicles include one or more inverters. Inverters use actively controlled switches to convert the DC voltage into a sinusoidal, or approximately sinusoidal, AC voltage output.

Two level voltage source inverters include limitations related to the efficiency driven by high switching losses and current ripples, reliability degradation due to high dv/dt (change in voltage over time), di/dt (change in current over time), and electromagnetic interferences, and power density degradation due to large capacitance requirements. Existing multilevel inverters attempt to address some of these issues, but at larger physical size, as well as very large capacitance requirements that can render them unsuitable for some applications.

SUMMARY

In one exemplary embodiment, a multilevel inverter includes a set of inverter switches arranged in a multilevel inverter topology having a high voltage (V) input, a low voltage input and an intermediate voltage input, and a first voltage source connecting the high voltage input to the intermediate voltage input and a second voltage source connecting the intermediate voltage input to the low voltage source.

In addition to one or more of the features described herein, the first voltage source and the second voltage source have balanced voltage potential.

In addition to one or more of the features described herein, the first voltage source and the second voltage source have uneven voltage potential.

In addition to one or more of the features described herein, the first voltage source has a higher voltage potential than the second voltage source.

In addition to one or more of the features described herein, the second voltage source has a higher voltage potential than the first voltage source.

In addition to one or more of the features described herein, the first voltage source and the second voltage source are a single battery, the single battery includes a first high voltage terminal, a second low voltage terminal and at least one third terminal having an intermediate voltage potential.

In addition to one or more of the features described herein, the multilevel inverter further includes: a first capacitor connecting the high voltage input to the intermediate voltage input and a second capacitor connecting the intermediate voltage input to the low voltage input, and a first capacitance of the first capacitor and a second capacitance of the second capacitor are limited to a size sufficient to provide high frequency ripple filtering.

In addition to one or more of the features described herein, the switches are arranged in one of a T-type inverter topology, a clamped inverter topology and an active clamped inverter topology.

In addition to one or more of the features described herein, the switches are arranged in a T-type inverter topology.

In addition to one or more of the features described herein, the switches are arranged in a floating capacitor multilevel inverter topology, and wherein the multilevel inverter comprises a plurality of intermediate voltage inputs.

In another exemplary embodiment, a vehicle includes: an electric power storage system including a battery module having a plurality of storage cells, at least one electric motor is configured to convert received electric power to mechanical rotation and output the mechanical rotation to at least one vehicle drive system, a multilevel inverter system is configured to receive Direct Current (DC) power from the electric energy storage system and provide Alternating Current (AC) power to the at least one electric motor. The multilevel inverter system includes: a set of inverter switches arranged in a multilevel inverter topology having a high Voltage (V) input, a low voltage input and an intermediate voltage input, and wherein the high voltage input is connected to a high voltage output of the battery module, the low voltage input is connected to a low voltage output of the battery module, and the intermediate voltage input is connected to an intermediate voltage output of the battery module.

In addition to one or more of the features described herein, the plurality of storage cells is divided into at least two subsets of storage cells and wherein the high voltage output of the battery module is a combined voltage potential of a the at least two subsets of storage cells, and wherein the intermediate voltage output is a voltage potential of a first subset of the at least two subsets of storage cells.

In addition to one or more of the features described herein, the combined voltage potential of the at least two subsets of storage cells is twice the voltage potential of the first subset of the at least two subsets of storage cells.

In addition to one or more of the features described herein, the set of inverter switches is configured as one of a T-type inverter topology, a clamped inverter topology and an active clamped inverter topology.

In addition to one or more of the features described herein, the set of inverter switches is configured as a T-type inverter topology.

In addition to one or more of the features described herein, the vehicle further includes a first capacitor connecting the high voltage input to the intermediate voltage input and a second capacitor connecting the intermediate voltage input to the low voltage input, wherein a capacitance of the first capacitor and a capacitance of the second capacitor is limited to a capacitance required for high frequency ripple filtering.

In addition to one or more of the features described herein, the set of inverter switches are arranged in a floating capacitor multilevel inverter topology, and wherein the multilevel inverter comprises a plurality of intermediate voltage inputs.

In addition to one or more of the features described herein, each intermediate voltage input in the plurality of intermediate voltage inputs is connected to at least one other of the intermediate voltage inputs, the high voltage input and the low voltage input via a distinct section of the battery module.

In yet another exemplary embodiment, a method for providing alternating current (AC) power to a vehicle includes converting DC voltage from a battery module into AC voltage using a multilevel inverter topology. The multilevel inverter topology includes a direct connection to a high voltage terminal of the battery module, a direct connection to a low voltage terminal of the battery module, and a direct connection to at least one intermediate voltage terminal of the battery module.

In addition to one or more of the features described herein, the battery module has a single intermediate a first voltage difference between the high voltage terminal and the intermediate voltage terminal is identical to a second voltage difference between the intermediate voltage terminal and the low voltage terminal.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
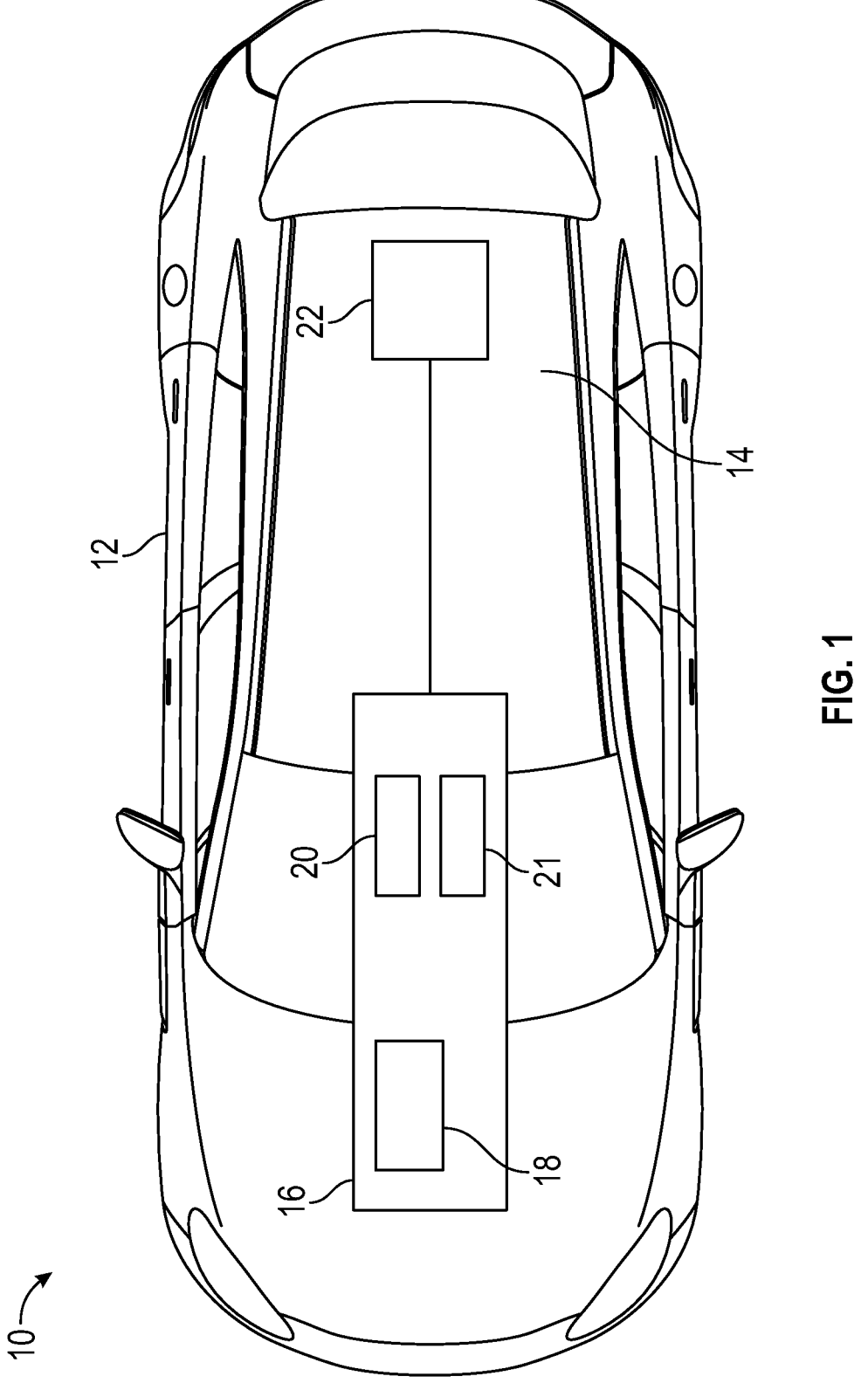
FIG. 1 is an exemplary vehicle including a Direct Current (DC) energy storage system and a pair of Alternating Current (AC) driven drive motors.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with some exemplary embodiments, the multilevel inverter systems described herein generally utilize an intermediate voltage node at a voltage level lower than the high voltage terminal, and higher than the low voltage/zero voltage terminal. The intermediate voltage node is directly connected to an intermediate voltage tap within a corresponding power source. In some examples, the intermediate voltage tap is at a split in a split battery pack, where the battery pack includes multiple cells and the voltage at the split is a combined voltage of a subset of cells in the battery. Providing the direct connection to an intermediate voltage tap allows for the multilevel inverter to be operated more efficiently, decreases the required size of terminal capacitors, and decreases the ripple current present on the output of the multilevel inverter compared to two-level voltage level inverters. The direct connection is facilitated via the use of a battery, or other direct current (DC) storage system that includes additional terminals beyond a high voltage and low/zero voltage terminal.

FIG. 1 shows an embodiment of a motor vehicle 10, which includes a vehicle body 12 defining, at least in part, an occupant compartment 14. The vehicle body 12 also supports various vehicle subsystems including a propulsion system 16, a battery system 22 and other subsystems to support functions of the propulsion system 16 and other vehicle components, such as a braking subsystem, a suspension system, a steering subsystem, a fuel injection subsystem, an exhaust subsystem and others.

The vehicle 10 may be a combustion engine vehicle, an electrically powered vehicle (EV) or a hybrid vehicle. In an embodiment, the vehicle 10 is a hybrid vehicle that includes a combustion engine system 18 and at least one electric motor assembly. For example, the propulsion system 16 includes a first electric motor 20 and a second electric motor 21. The motors 20 and 21 may be configured to drive wheels on opposing sides of the vehicle 10. Any number of motors positioned at various locations about the vehicle 10 may be used.

The battery system 22 may be electrically connected to the motors 20 and 21 and/or other components, such as vehicle electronics. The battery system 22 may be configured as a rechargeable energy storage system (RESS), and includes multiple cells partitioned into portions, as well as multiple voltage outputs (taps), each of which provides a different voltage level.

Figure 2:
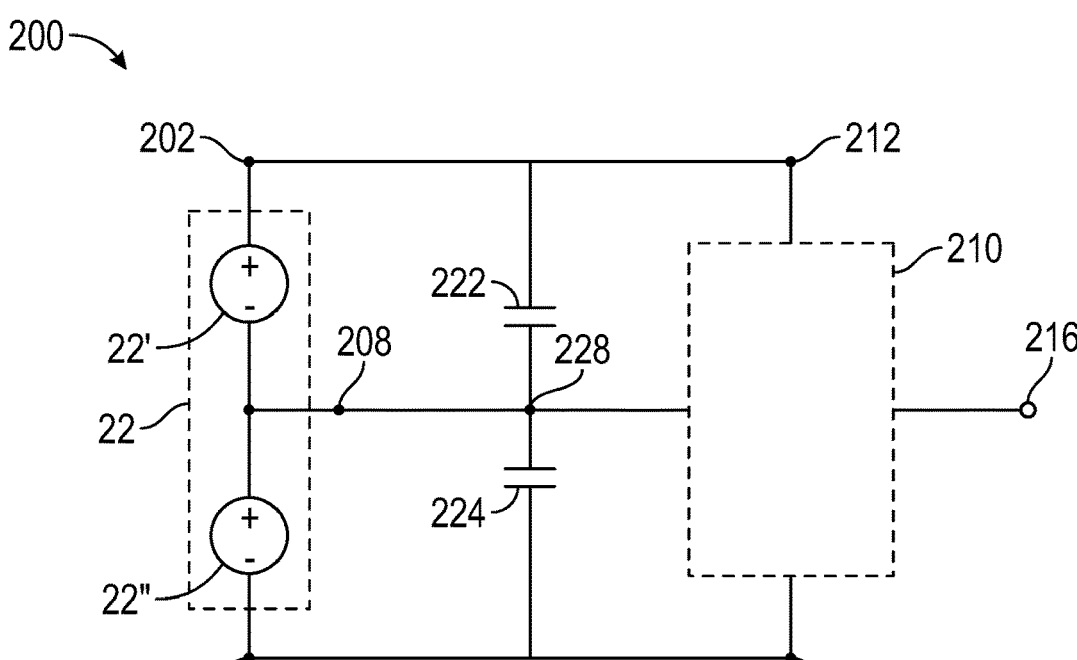
FIG. 2 is a schematic multilevel inverter for converting DC voltage from the energy storage system to AC voltage for the drive motors.

With continued reference to FIG. 1, FIG. 2 illustrates an exemplary inverter system 200 including a multilevel inverter 210 for converting DC power from the battery system 22 to an alternating current (AC) power output 216 to one or more motors 20, 21. The AC power output 216 provides drive power to the motor(s) 20, 21 to which the AC power output 216 is connected. The battery system 22 includes a high voltage output terminal 202 and a low voltage output terminal 204, each of which are connected to corresponding input terminals 212, 214 of the multilevel inverter 210 topology. As used herein, "high voltage" refers to the voltage potential of the battery system 22 when fully charged, "low voltage" refers to a zero, or approximately zero, voltage potential, and intermediate voltage refers to a voltage potential between the high and low voltage.

Connected across the terminals 212, 214 is a pair of series arranged capacitors 222, 224. The capacitors 222, 224 are connected at an intermediate voltage node 228. In existing systems, a similar intermediate voltage node operates only connected to each of the capacitors and the inverter and provides a floating intermediate point. The floating intermediate point has a potential that varies depending on the charge/discharge states and rates of the capacitors, resulting in a node without a constant voltage level.

In the embodiment of FIG. 2, the intermediate voltage node 228 is directly connected to a corresponding intermediate voltage output node 208 of the battery system 22. The intermediate voltage output node 208 can be provided at a midpoint between sets of cells 22', 22", modules, or packs within the battery system 22. In alternative examples, the intermediate voltage output 208 can be a node connecting two series arranged battery systems 22. The two sets of cells 22', 22" can have identical voltage potentials, the first set of cells 22' can have higher voltage potential than the second set of cells 22", or the second set of cells 22" can have a higher voltage potential than the first set of cells 22'. As used herein, the voltage potential of a set of cells 22', 22" or other similar component refers to the voltage differential output by the set of cells 22', 22" while the set of cells 22', 22" is at full capacity. In alternate examples, the multilevel inverter 210 can include up to N intermediate voltage connections for an N-level invertor, where N is a total available voltage outputs from the battery system 22.

The direct connection between the intermediate voltage node 228 and the intermediate voltage output node 208 provides three stable voltage levels to supply the inverter 210, with the intermediate voltage level not being dependent on the charge state of the capacitors 222, 224. The three stable voltage levels, in turn allow for the capacitors to solely operate as high frequency ripple current filters. Being limited to the ripple filtering function allows for a substantial reduction in physical size, volume, capacitance and weight of the capacitors 222, 224.

Figure 3:
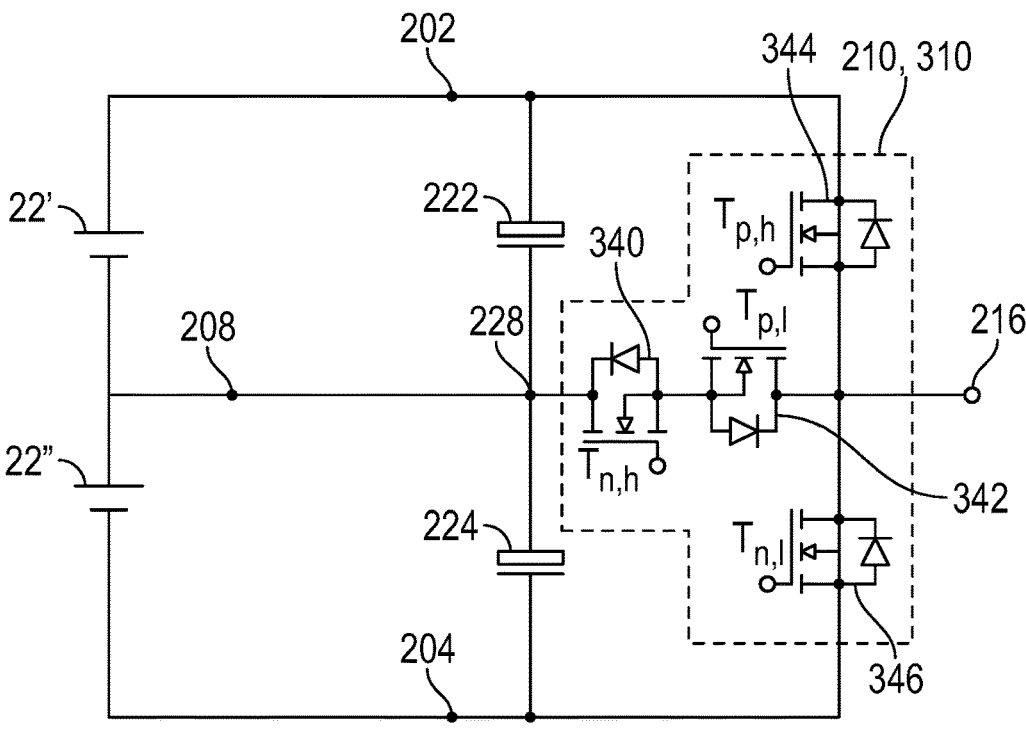
FIG. 3 is an example single phase leg of a T-type multilevel inverter topology configured to interface with a direct midpoint terminal.
Figure 4:
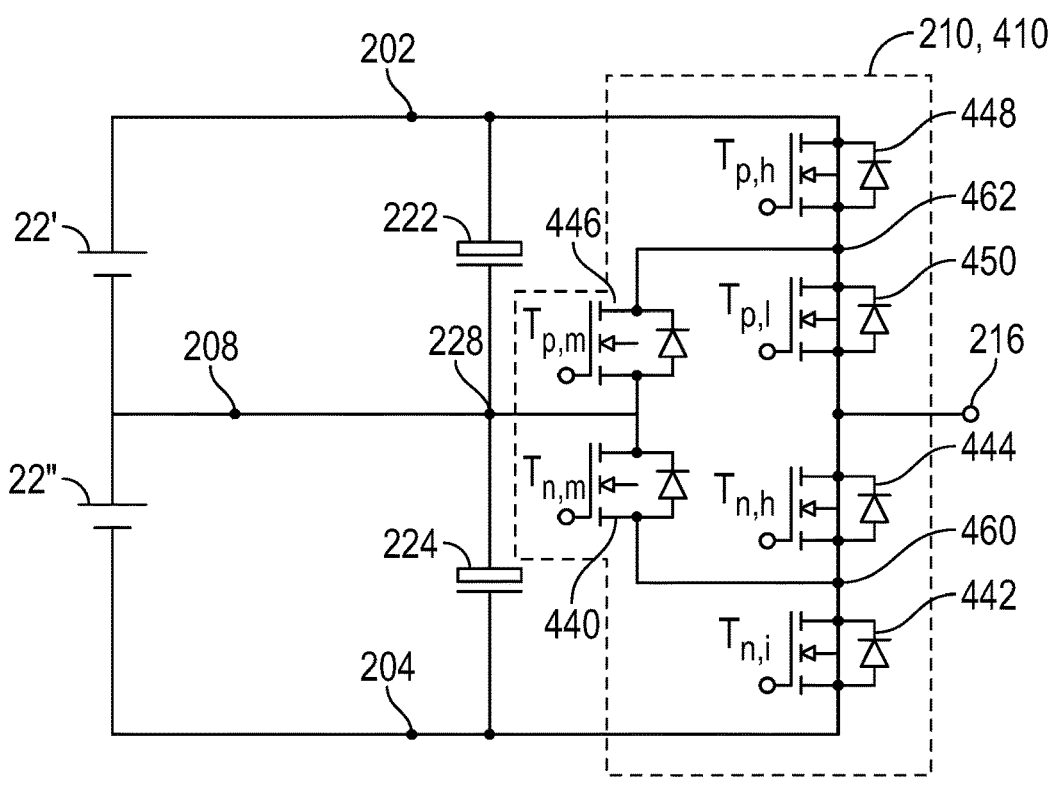
FIG. 4 is an example single phase leg of an active neutral point clamped multilevel inverter topology configured to interface with a direct midpoint terminal.
Figure 5:
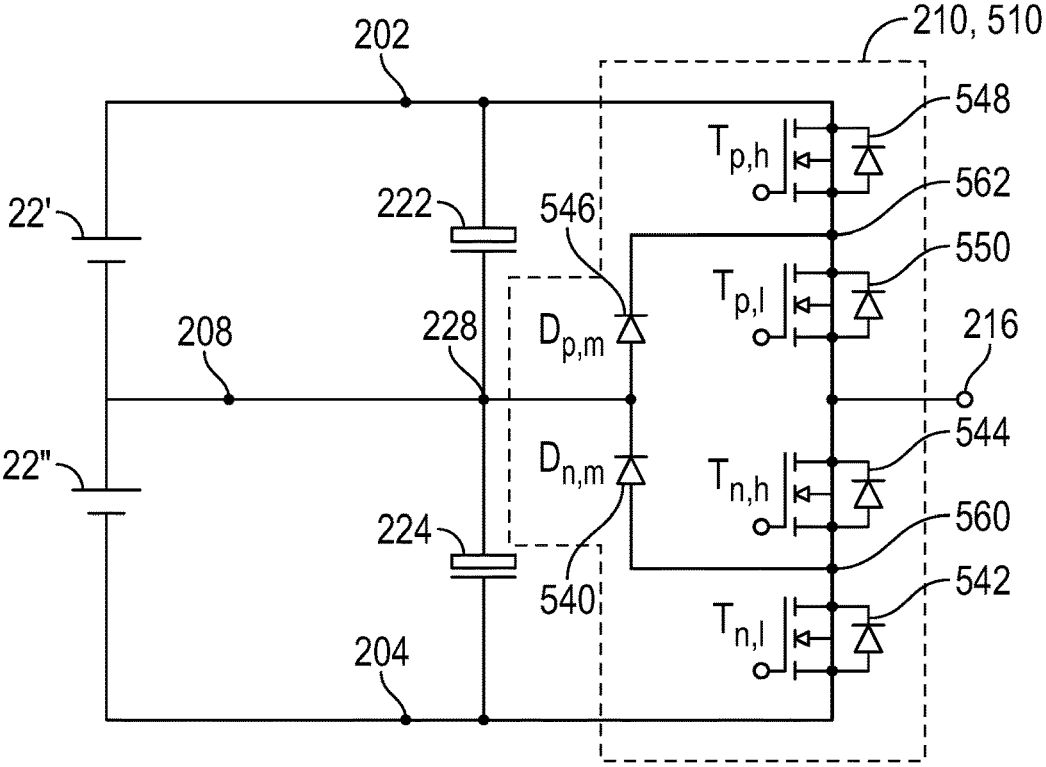
FIG. 5 is an example single phase leg of a diode-clamped (neutral point clamped) multilevel inverter topology configured to interface with a direct midpoint terminal.

With continued reference to FIG. 2, the FIGS. 3-5 illustrate exemplary phase leg types for multi-level inverter topologies 310, 410, 510 that can be utilized as the inverter 210 of the system 200 illustrated in FIG. 2, with the topology 310 being a T-type inverter, the topology 410 being an active neutral point clamped inverter, and the topology 510 being an diode-clamped (neutral point clamped) inverter. In each case, the illustrated inverter phase leg topology 310, 410, 510 is illustrated in the context of the inverter system 200 of FIG. 2 and is actively controlled by a controller within the vehicle according to known control processes. Those skilled in the art will appreciate that for a three phase system, there will be three legs in parallel.

Referring specifically to the T-type inverter 310 phase leg shown in FIG. 3, the inverter phase leg 310 includes a first MOSFET switch 340 including a drain connected to the intermediate voltage node 228 and a source connected to the source of a second MOSFET switch 342. The drain of the second MOSFET switch 342 is connected to the power output 216. In addition, the inverter phase leg 310 includes a third MOSFET switch 344 with a drain connected to the high voltage output terminal 202, and a source connected to the power output 216. A fourth MOSFET switch 346 includes a drain connected to the power output 216 and a source connected to the low voltage output terminal 204.

Each of the switches 340, 342, 344, 346 is controlled via a control signal provided to the corresponding gate, and a controller sets the control signals and switching rates according to known inverter control methodologies to achieve desired AC power output characteristics at the power output 216. While illustrated herein as MOSFET switches as an example, it is appreciated that the switches 340, 342, 344, 346 can be IGBT, BJT, or FET switches made of Si, SiC, GaN or other semiconductor materials.

Referring specifically to the active neutral point clamped inverter phase leg 410 of FIG. 4, the inverter phase leg 410 includes a first MOSFET switch 440 with drain connected to the intermediate voltage node 228 and a source connected to a node 460 connecting a drain of a second MOSFET switch 442 and a source of a third MOSFET switch 444. A source of the second MOSFET switch 442 is connected to the low voltage output 204. A drain of the third MOSFET switch 444 is connected to the AC power output 216.

Mirroring the first, second and third MOSFET switches 440, 442, 444 are a fourth MOSFET switch 446 with a source connected to the intermediate voltage node 228 and a drain connected to a node 462 connecting the fifth and sixth MOSFET switches 448, 450. The fifth MOSFET switch 448 includes a drain connected to the high voltage output terminal 202 and a source connected to the node 462 and the sixth MOSFET switch 450 includes a drain connected to the node 42 and a source connected to the AC power output 216.

Each of the switches 440, 442, 444, 446, 448, 450 is controlled via a control signal provided to the corresponding gate, and a controller sets the control signals and switching rates according to known inverter control methodologies to achieve desired AC power output characteristics at the power output 216.

Referring specifically to the diode clamped (neutral point clamped inverter) phase leg 510 of FIG. 5, the topology is similar to that of the of the active neutral point clamped inverter phase leg 410, with the first MOSFET switch 440 and the fourth MOSFET switch 446 being replaced with a first diode 540 and a second diode 546. An anode of the first diode 540 is connected to the node 560 connecting the second and third MOSFET switches 542, 544 and a cathode of the first diode 540 is connected to the intermediate voltage node 228. A cathode of the second diode 546 is connected to the node 562 connecting the fifth and sixth MOSFET switches 548, 550 and an anode connected to the intermediate voltage node 228.

Each of the switches 542, 544, 548, 550 is controlled via a control signal provided to the corresponding gate, and a controller sets the control signals and switching rates according to known inverter control methodologies to achieve desired AC power output characteristics at the power output 216.

Referring now to all FIGS. 1-5, a motor 20, 21 (see FIG. 1) provided power by inverters 200 constructed of the phase legs 310, 410, 10 of FIGS. 3-5, operates more efficiently due to a reduced iron loss compared to two-voltage level inverters. In some examples the increased efficiency can be as much as 30% increase in efficiency. Furthermore, the motor 20, 21 can be constructed to be more power dense due to the lower losses and can rely on lower grade (i.e., thinner) interturn insulation, and enhancing slot turn copper fill factors. In addition, the lower dv/dt (change in voltage over time) reduces the bearing currents of the motor 20, 21 which in turn increases the lifecycle of the motor 20, 21.

Figure 7:
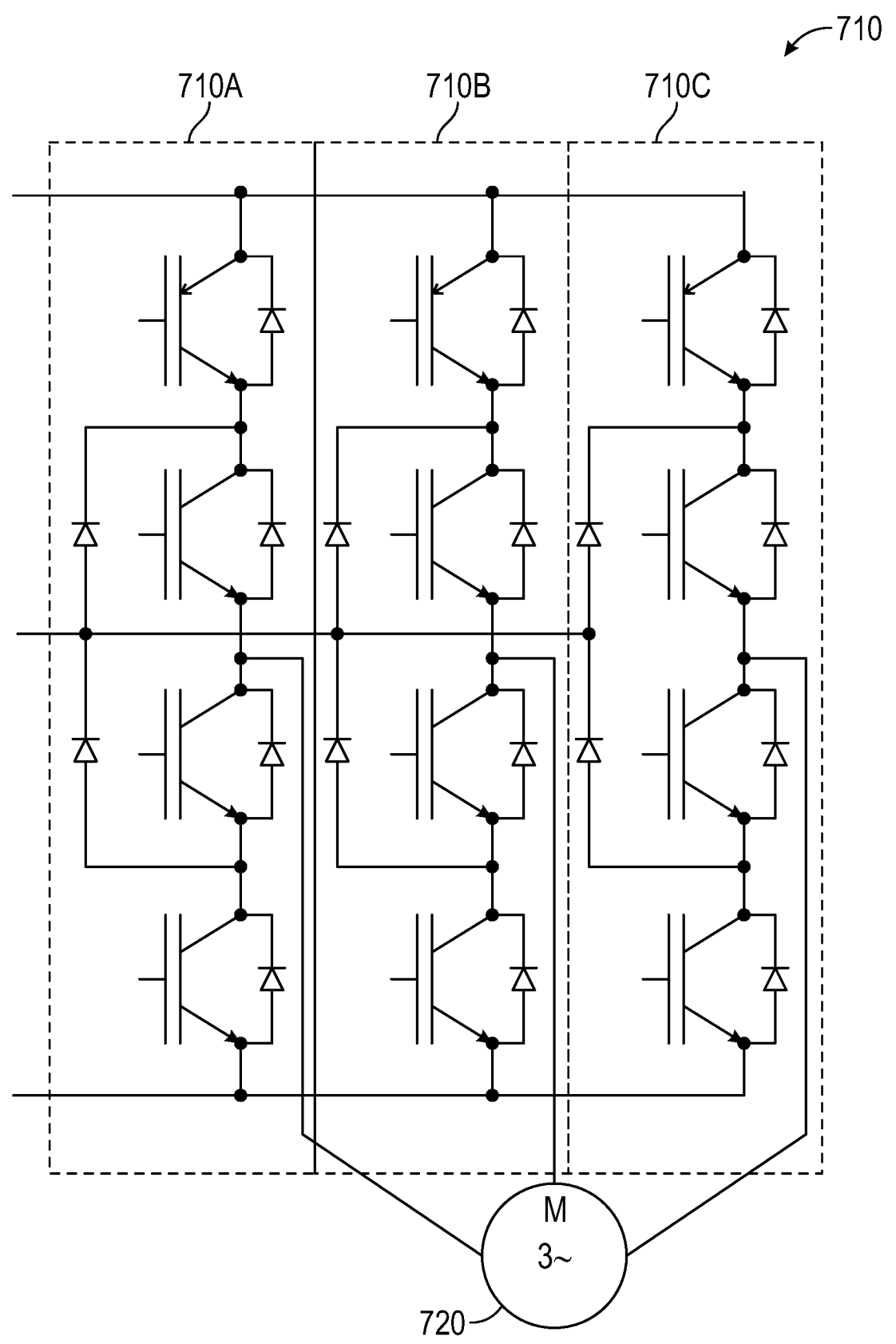
FIG. 7 is an example three phase inverter constructed of three diode-clamped single phase legs.

With reference to FIGS. 3-5, and to FIG. 5 specifically, FIG. 7 illustrates a full three phase inverter 710 including three phase legs 710A, 710B, 710C, each of which is controlled to output an AC voltage offset from the other two legs by 120 degrees, thereby providing full three phase energy to a motor 720. Each of the phase legs 710A, 710B, 710C is identical to the phase leg 510 illustrated in FIG. 5. It is appreciated that in practice a three phase inverter, such as the inverter 710 of FIG. 7 can be constructed using identical phase legs of any of the identified phase legs 310, 410, 510 or a combination thereof depending on the needs and constraints of the particular system. The exemplary inverter 710 is a three phase inverter and outputs three phases to the motor 720, although alternative examples can output alternative numbers of phases.

While illustrated in FIGS. 2-5, and 7 using multilevel inverters 210, 710 and phase legs 310, 410, 510 to generate three phase outputs from a DC energy storage system having three voltage levels, it is appreciated that a DC energy storage system having any number (N) of levels can provide a similar direct and stable voltage connection to corresponding intermediate voltage inputs of an N-level inverter, and the concepts disclosed herein are not limited to use with a three-level inverter.

Figure 6:
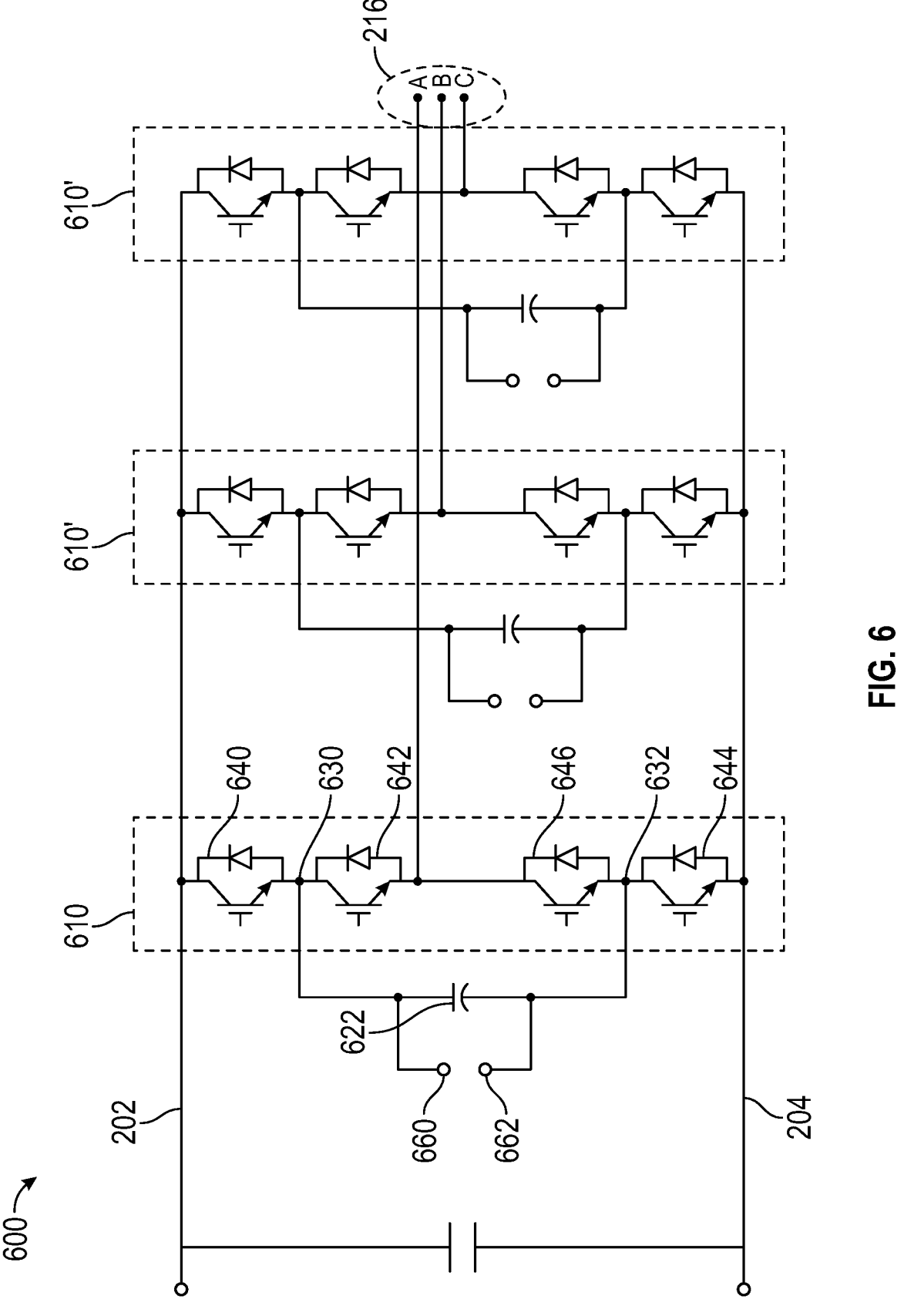
FIG. 6 is an example three phase floating capacitor multilevel inverter augmented by connections to multiple stiff voltage taps of a battery system.

With continued reference to the general systems described above, the fixed intermediate voltage tap concept facilitated by the multi-output battery system 22 can be further extended to operations with a floating capacitor multilevel inverter topology. While illustrated herein with a two level topology, one of skill in the art will appreciate that the floating capacitor multilevel topology can be extended to 3, 4, 5, or more levels according to known principles. One such example is illustrated in FIG. 6. In the example of FIG. 6, the sets of cells within the battery pack can have different voltage potentials from each other, and the multiple taps allow for each set of cells to output to a corresponding pair of input terminals 660, 662 of the floating capacitor multilevel inverter 600. The exemplary floating capacitor multilevel inverter outputs three phases at an AC output 216, although alternative examples can output alternative numbers of phases.

Parallel to each pair of input terminals 660, 662 is a corresponding capacitor 622, with a high input terminal 660 and the capacitor being provided to a first node connecting a first and second switch 640, 642 and a low input terminal 662 and the capacitor 622 being connected to a node connected a third and fourth switch 644, 646. The first switch 640 includes an emitter connected to the first node 630 and a collector connected to a high voltage leg 202. The second switch 642 includes a collector connected to the first node 630 and an emitter connected to a first phase output 216A of the floating capacitor multilevel inverter. The third switch 644 includes an emitter connected to the low input terminal 662 node 632 and a collector connected to the low voltage leg 204. The fourth switch 646 includes an emitter connected to the second node 632 and an emitter connected to the AC power output 216A. Each switch 640, 642, 644, 646 includes a base connected to a motor controller. Each module 610, 610' is fundamental identical and provides a distinct phase power output 216A, 216B, 216C. This configuration can be extended to any number of phases, with the control of the switches 640, 642, 644, 646 controlling the phase differences and the outputs 216A, 216B, 216C.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A multilevel inverter comprising:
a set of inverter switches arranged in a multilevel inverter topology having a high voltage (V) input, a low voltage input and an intermediate voltage input, wherein the inverter topology is an active neutral point clamped inverter;
a first voltage source connecting the high voltage input to the intermediate voltage input and a second voltage source connecting the intermediate voltage input to the low voltage input; and
a first capacitor connecting the high voltage input to the intermediate voltage input and a second capacitor connecting the intermediate voltage input to the low voltage input, and wherein a first capacitance of the first capacitor and a second capacitance of the second capacitor is at most a size sufficient to provide high frequency ripple filtering.

2. The multilevel inverter of claim 1, wherein the first voltage source and the second voltage source have balanced voltage potential.

3. The multilevel inverter of claim 1, wherein the first voltage source and the second voltage source have uneven voltage potential.

4. The multilevel inverter of claim 3, wherein the first voltage source has a higher voltage potential than the second voltage source.

5. The multilevel inverter of claim 3, wherein the second voltage source has a higher voltage potential than the first voltage source.

6. The multilevel inverter of claim 1, wherein the first voltage source and the second voltage source are a single battery, the single battery including a first high voltage terminal, a second low voltage terminal and at least one third terminal having an intermediate voltage potential.

7. The multilevel inverter of claim 1, wherein the inverter switches are arranged in one of a T-type inverter topology, a clamped inverter topology and an active clamped inverter topology.

8. The multilevel inverter of claim 7, wherein the inverter switches are arranged in a T-type inverter topology.

9. The multilevel inverter of claim 1, wherein the inverter switches are arranged in a floating capacitor multilevel inverter topology, and wherein the multilevel inverter comprises a plurality of intermediate voltage inputs.

10. The multi-level inverter of claim 1, wherein the intermediate voltage level is independent of the charge state of the capacitors.

11. A vehicle comprising:
an electric energy storage system including a battery module having a plurality of storage cells;

at least one electric motor configured to convert received electric power to mechanical rotation and output the mechanical rotation to at least one vehicle drive system;

a multilevel inverter system configured to receive Direct Current (DC) power from the electric energy storage system and provide Alternating Current (AC) power to the at least one electric motor, wherein the multilevel inverter system includes:

a set of inverter switches arranged in a multilevel inverter topology having a high Voltage (V) input, a low voltage input and an intermediate voltage input, wherein the inverter topology is an active neutral point clamped inverter;

wherein the high voltage input is connected to a high voltage output of the battery module, the low voltage input is connected to a low voltage output of the battery module, and the intermediate voltage input is connected to an intermediate voltage output of the battery module; and a first capacitor connecting the high voltage input to the intermediate voltage input and a second capacitor connecting the intermediate voltage input to the low voltage input, wherein a capacitance of the first capacitor and a capacitance of the second capacitor is at most a capacitance required for high frequency ripple filtering.

12. The vehicle of claim 11, wherein the plurality of storage cells is divided into at least two subsets of storage cells and wherein the high voltage output of the battery module is a combined voltage potential of the at least two subsets of storage cells, and wherein the intermediate voltage output is a voltage potential of a first subset of the at least two subsets of storage cells.

13. The vehicle of claim 12, wherein the combined voltage potential of the at least two subsets of storage cells is twice the voltage potential of the first subset of the at least two subsets of storage cells.

14. The vehicle of claim 11, wherein the set of inverter switches is configured as one of a T-type inverter topology, a clamped inverter topology and an active clamped inverter topology.

15. The vehicle of claim 14, wherein the set of inverter switches is configured as a T-type inverter topology.

16. The vehicle of claim 11, wherein the set of inverter switches are arranged in a floating capacitor multilevel inverter topology, and wherein the multilevel inverter system comprises a plurality of intermediate voltage inputs.

17. The vehicle of claim 16, wherein each intermediate voltage input in the plurality of intermediate voltage inputs is connected to at least one other of the intermediate voltage inputs, the high voltage input and the low voltage input via a distinct section of the battery module.

18. The vehicle of claim 11, wherein the intermediate voltage level is independent of the charge state of the capacitors.

19. A method for providing alternating current (AC) power to a vehicle comprising converting DC voltage from a battery module into AC voltage using a multilevel inverter topology, wherein the inverter topology is an active neutral point clamped inverter, the multilevel inverter comprising:

a set of inverter switches arranged in a multilevel inverter topology having a high voltage (V) input, a low voltage input and an intermediate voltage input;

a first voltage source connecting the high voltage input to the intermediate voltage input and a second voltage source connecting the intermediate voltage input to the low voltage input;

a first capacitor connecting the high voltage input to the intermediate voltage input and a second capacitor connecting the intermediate voltage input to the low voltage input, and wherein a first capacitance of the first capacitor and a second capacitance of the second capacitor is at most a size sufficient to provide high frequency ripple filtering.

20. The method of claim 19, wherein the battery module has a single intermediate a first voltage difference between the high voltage terminal and the intermediate voltage terminal is identical to a second voltage difference between the intermediate voltage terminal and the low voltage terminal.

* * * * *